Oct. 10, 1939.  J. H. FRIDÉN  2,175,560
COLLAPSIBLE TUBE APPARATUS
Filed Dec. 28, 1935  7 Sheets-Sheet 3

Fig. 3.

INVENTOR:
John H. Fridén
BY
his ATTORNEY

Oct. 10, 1939.   J. H. FRIDÉN   2,175,560
COLLAPSIBLE TUBE APPARATUS
Filed Dec. 28, 1935   7 Sheets-Sheet 4

INVENTOR:
John H. Fridén
BY
his ATTORNEY

Patented Oct. 10, 1939

2,175,560

UNITED STATES PATENT OFFICE 2,175,560

COLLAPSIBLE TUBE APPARATUS

John H. Fridén, Maplewood, N. J., assignor to The Sun Tube Corporation, Hillside, N. J., a corporation of New Jersey Application December 28, 1935, Serial No. 56,467

18 Claims. (Cl. 198—20)

This invention relates to apparatus for automatically handling collapsible tubes and performing one or more finishing operations thereon. In a typical embodiment of the invention, devices are provided for conveying a continuous series of tubes, removing the tubes successively from the conveyor, applying the tubes successively to the spindles of a tube finishing machine, and performing one or more functions, such as a coating operation, upon each tube as it is moved past a predetermined position. Means may also be included, if desired, for removing the tubes from the spindles.

It has been a primary object of the invention to provide simple and effective means for accomplishing the results stated with a minimum of injury to the tubes in the handling of a large number of the same. Other objects and advantages of the invention will appear from the detailed description of the illustrative embodiments of the same which will now be given in conjunction with the accompanying drawings, in which:

Figure 3 is a side elevation of the apparatus.

Figure 1:
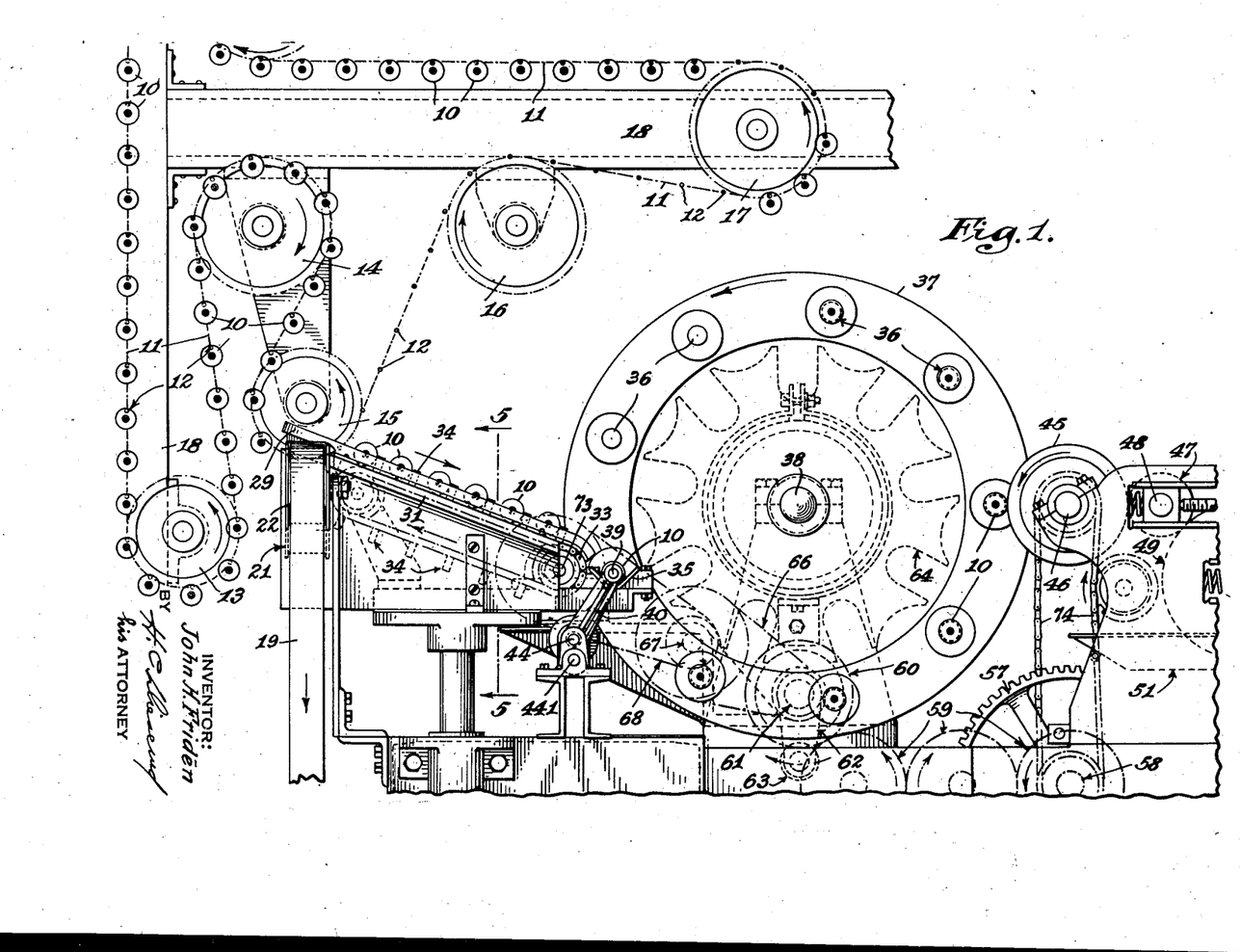
Figure 1 is a front elevation of a portion of the apparatus, showing the tube handling and coating devices and schematically showing the conveyor for delivering the tubes to be handled by the apparatus.

Referring now to the drawings, the tubes 10 to be handled by the improved devices are conveyed to the desired point by means of a chain 11, indicated by a dot and dash line in Figure 1. This chain is provided with a series of pins 12 at spaced points and is carried around a series of sprockets 13, 14, 15, 16 and 17, mounted in suitable bearings on the frame 18. It will be understood that the chain travels to and from any convenient point in the tube manufacturing plant and may be advanced either continuously or intermittently, as desired. In a typical installation the downwardly moving portion of the chain at the left end of Figure 1 may be assumed to come from a drying chamber of the type disclosed in my application Serial No. 11,283 filed on March 15, 1935. It may be assumed that the tubes carried by the chain have previously been coated and lithographed and are now prepared to receive a final coating of lacquer or the like. After passing around the pulley 17 the chain is passed through another drying zone to a suitable packing station and back to the starting point, as is more fully explained in my prior case.

Figure 4:
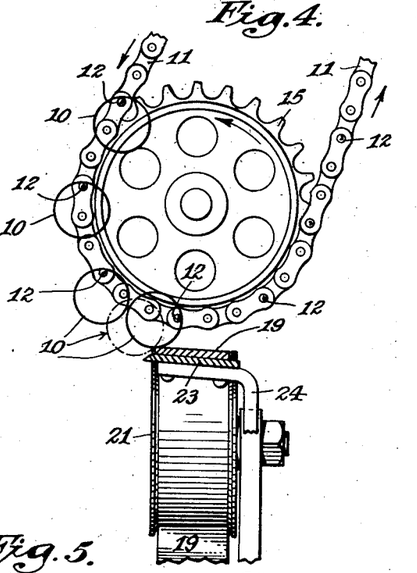
Figure 4 is an enlarged detail, partly in elevation and partly in section along the line 4—4 of Figure 3, showing a portion of the conveyor and a portion of the tube removing means.

The specific form of the chain is not material to the present invention so long as it is adapted to carry the pins 12, or similar tube supports, at suitably spaced intervals. A small section of a suitable chain is shown in Figure 4, the tube supporting pins being provided at every third pivot. As indicated in Figure 3, the chain is made to travel in a plane inclined at a slight angle to the vertical so that the pins have a slight upward slant to insure proper retention of the tubes. Any convenient means may be employed for driving the chain, suitable means being disclosed in the pending application mentioned.

As the chain is carried around the sprocket 15, the tubes are successively brought into engagement with a belt 19. This belt, as best shown in Figure 3, is carried by three pulleys 20, 21 and 22, journaled on the frame, and is advanced continuously in the direction indicated by the arrows on the pulleys. In passing from pulley 21 to pulley 22, it is supported by a member 23 carried by portions 24 and 25 of the frame structure. The support 23 is inclined upwardly from pulley 21 at the angle of the pins 12 and it is inclined transversely at a slight angle as shown in Figure 4. For the purpose of shifting the belt there may be provided a motor 26 operating, through any suitable speed reducer, upon the pulley 20. The motor shaft may, for example, carry a worm 27 cooperating with a worm wheel 28 in fixed relation to the pulley 20.

Referring to Figure 4, it will be seen that as the conveyor chain passes downwardly around the sprocket 15, the tubes 10 will be brought successively into engagement with the belt 19. As soon as a sufficient engagement is effected, to create a greater friction between the belt and the tube than exists between the tube and the supporting pin 12, the tube will be picked up by the belt and removed from the pin. During the removal of the tube the chain will continue to advance a slight distance, thus insuring the location of the tube well onto the upper surface of the belt before it leaves the pin. The slight transverse pitch of the belt, as shown in Figure 4, furthermore, assists in producing a slight lateral movement of the tube toward the center of the belt as it is being carried forwardly by the latter.

Figure 2:
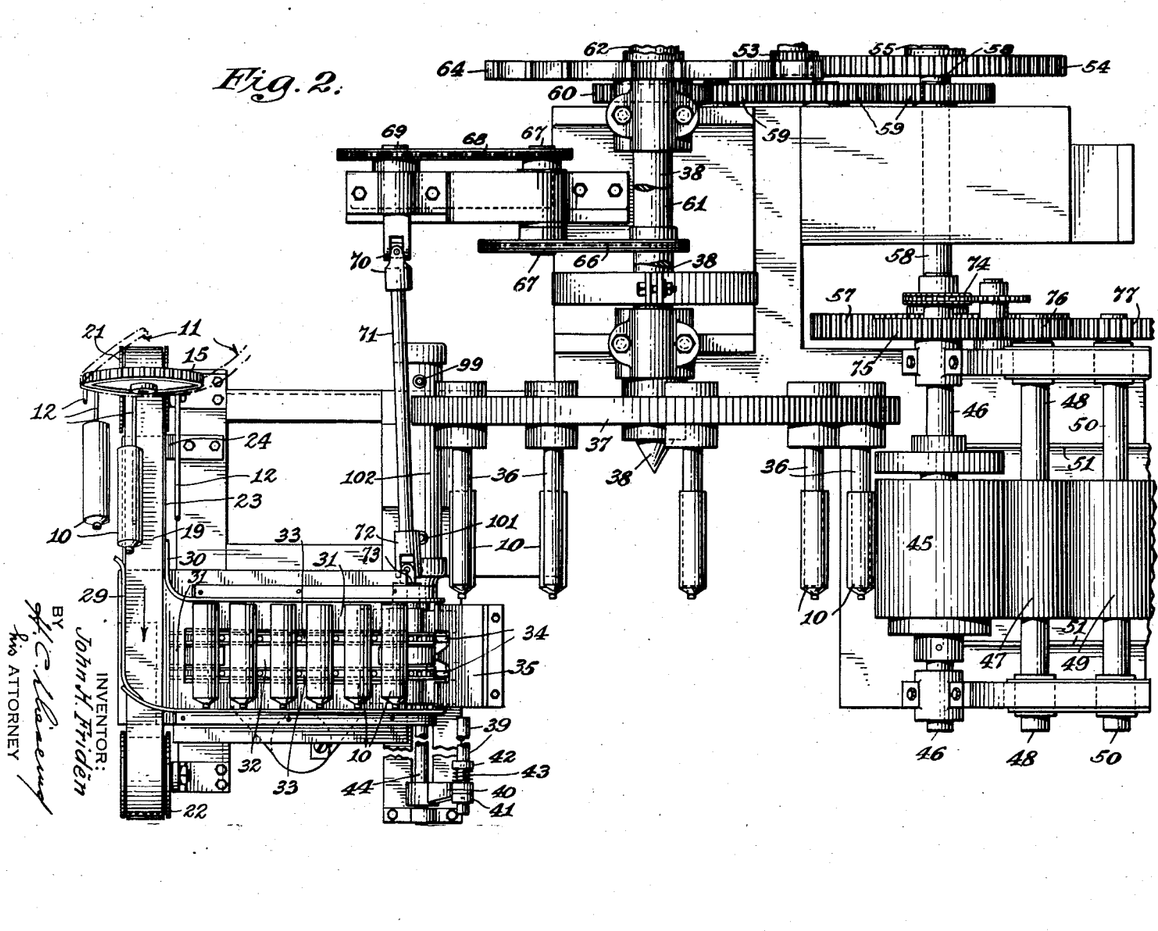
Figure 2 is a plan view of the improved apparatus.
Figure 5:
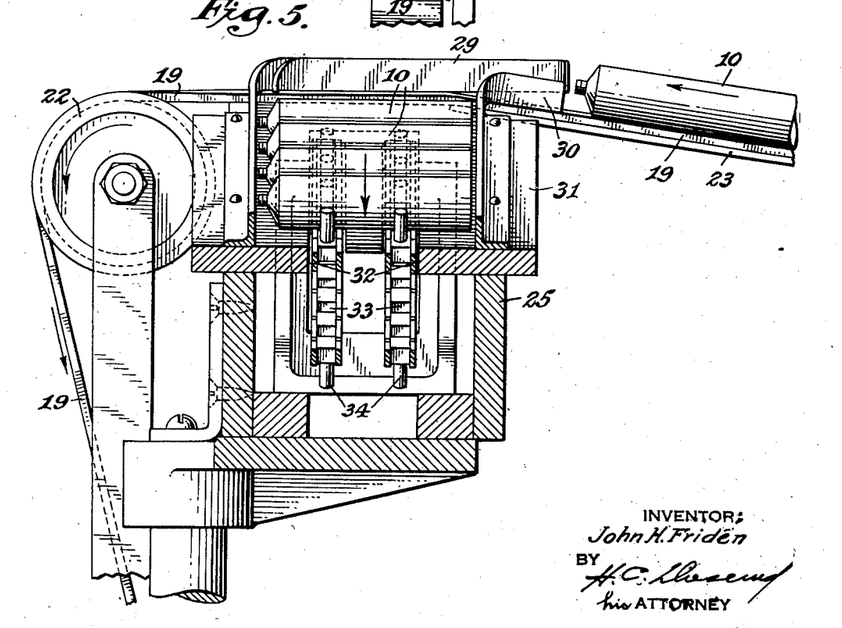
Figure 5 is an enlarged detail, partly in elevation and partly in section, along the line 5—5 of Figure 1, showing a portion of the tube handling devices.

As best shown in Figures 2 and 5, the tube is carried by the belt between a pair of guide rails 29 and 30, the rail 29 extending transversely across the belt and then for some distance parallel with the edge of the belt. The outer end of this rail, furthermore, is bent outwardly to a slight extent to produce a camming effect upon the advancing tube, if this should be necessary. By the time the tube reaches the position in line with the passageway formed by the parallel portions of the guide rails extending at right angles to the direction of movement of the belt, it will be ready to roll off the edge of the belt onto a fixed incline 31. Should the tube not be discharged naturally, by its own rolling action in this manner, the guide 29 will, of course, assist in discharging the tube from the belt. At the center of the incline 31 there is provided an elongated opening 32 beneath which there is mounted a pair of chains 33. These chains carry series of pins 34 suitably spaced to allow a tube to fall between successive pairs. At the lower end of the incline 31 there is arranged a V-shaped trough 35 into which the tubes are dropped one at a time by gravity as they are carried forwardly in appropriately spaced relation under the control of the pins 34. The trough 35 is so mounted on a fixed portion of the frame that the axis of the tube therein will be held directly in line with one of a series of spindles 36 carried by a rotatable head 37 secured to a shaft 38. As will be explained more fully hereinafter, the head 37 is given a step-by-step movement to carry the spindles 36 successively into the position in line with the trough 35. Preferably the spindles are rotatably mounted on the head 37 so that they may turn freely during the coating operation, to be later described, although if desired they may be fixed and the tubes simply allowed to slip freely around the spindles.

For the purpose of transferring the tubes from the trough 35 to the alined spindles 36, there is provided a pusher rod 39 carried by an arm 40. Preferably a yielding connection is provided between the rod 39 and the supporting arm, although this is not essential. As illustrated, the yielding connection may be provided by a sliding fit between the rod and arm 40 and by the provision of collars 41 and 42 on the rod, together with a spring 43 acting between the arm 40 and the collar 42. This spring normally holds the collar 41 against the arm but may yield when some unusual resistance is met with so as to prevent damage being done to the machine, or possibly to the tube. The arm 40 is secured to a rod 44, which may be reciprocated in any suitable manner. Two different arrangements for accomplishing this result will be explained more fully hereinafter. The lower end of arm 40 is slidably mounted on a guide rod 441 carried by a pair of fixed brackets on the machine frame. If the tubes to be handled by the machine are closed at their outer ends, some provision should be made for the escape of air which would otherwise be entrapped in the application of the tubes to the spindles. For this purpose the spindles may either be suitably tapered to allow the relatively easy escape of air or they may have passages through them in free communication with the outside.

After a tube has been applied to one of the spindles 36, in the manner explained, the head 37 will be rotated one step to carry the next spindle into line with the trough to receive another tube. This rotation is counter-clockwise, as shown in Fig. 1, thereby carrying the tubes downwardly and toward the right in this figure. On the fourth step of movement each tube is carried into engagement with a roller 45, having a soft, yielding outer surface and adapted to apply a coating of any suitable character to the outer surface of the tube. In the typical installation suggested above, the coating substance may be in the nature of a thin, colorless lacquer, which is applied to a previously coated and lithographed tube. To apply the coating, the roller 45 is rotated by the turning of its supporting shaft 46, in a manner to be explained. Roller 45 receives its coating material from a roller 47 carried by a shaft 48, which roller is in turn engaged with a roller 49 carried by a shaft 50 and adapted to travel through a bath of the coating substance maintained in a suitable pan or trough 51. Suitable means are provided for driving all of the rollers, as will be later explained.

Turning now to Figure 3, the driving connections for operating the various portions of the machine, other than the conveyor chain and the belt 19, will be explained. A suitable motor 52 may be provided as the source of power, the shaft of this motor carrying a pinion 53 meshing with a large gear 54 on a shaft 55. A small pinion 56 on this shaft engages a large gear 57 on a shaft 58. A considerable speed reduction is effected through this gearing. At the rear end of the shaft 58 suitable gearing 59 is provided to connect the same with a gear 60 secured to a shaft 61. This shaft has secured thereto an arm 62 carrying a roller 63 forming the driving element of a Geneva mechanism for rotating the shaft 38. For this purpose a Geneva wheel 64 secured to the shaft 38 is provided in the plane of the roller 63 and a locking disc 65 is secured to the shaft 61 in the same plane. Through this Geneva mechanism the shaft 38 is given one step of movement upon each revolution of the shaft 61. In the machine illustrated nine such steps of movement are required to make one revolution of the shaft 38.

At another point on the shaft 61 there is secured a sprocket arranged to drive a chain 66, which in turn drives a sprocket secured to a stub shaft 67. The opposite end of this stub shaft is connected by means of a chain 68 with a shaft 69 so that the latter is continuously rotated during the operation of the machine. The size of the various sprockets cooperating with the chains 66 and 68 is such that a slight reduction in the speed of rotation of the shaft 69 with relation to the shaft 61 is effected. Shaft 69 is connected by a universal coupling 70 with a shaft 71, which in turn is connected through a universal coupling 72 with a shaft 73. The latter has secured thereto suitable sprockets for operating the chains 33 to advance the pins 34 at a desired speed.

The coating mechanism is driven by a connection from the shaft 58 comprising a chain 74 cooperating with a sprocket secured to the shaft 58 and another sprocket secured to the shaft 46. This causes rotation of the roller 45 while the other rollers are driven through gearing 75, 76 and 77.

For the purpose of operating the push rod 39, to apply tubes to the spindles 36, two different arrangements are disclosed. The first of these is illustrated in Figures 6 to 10 and includes a cam 78 which operates upon a roller 79 carried by a link 80 having an elongated slot that straddles the shaft 61. The lower end of the link 80 is pivotally connected at 81 to an arm 82. The length of the link 80 may be made adjustable by the provision of a right and lefthand, threaded member 83 joining two separable portions of the link. One end of the arm 82 is attached to a flat-sided portion 84 of a rotatable stud 85. The end of the arm 82 may be bifurcated for this purpose and a bolt 86 provided to clamp the bifurcations upon the portion 84. A spring 820 connected between a portion of the arm 82 and a fixed point (not shown) on the frame tends to hold the arm in the position shown in Figure 6, with the roller 79 against the periphery of the cam 78.

Figures 6, 7, 8, 9, 10:
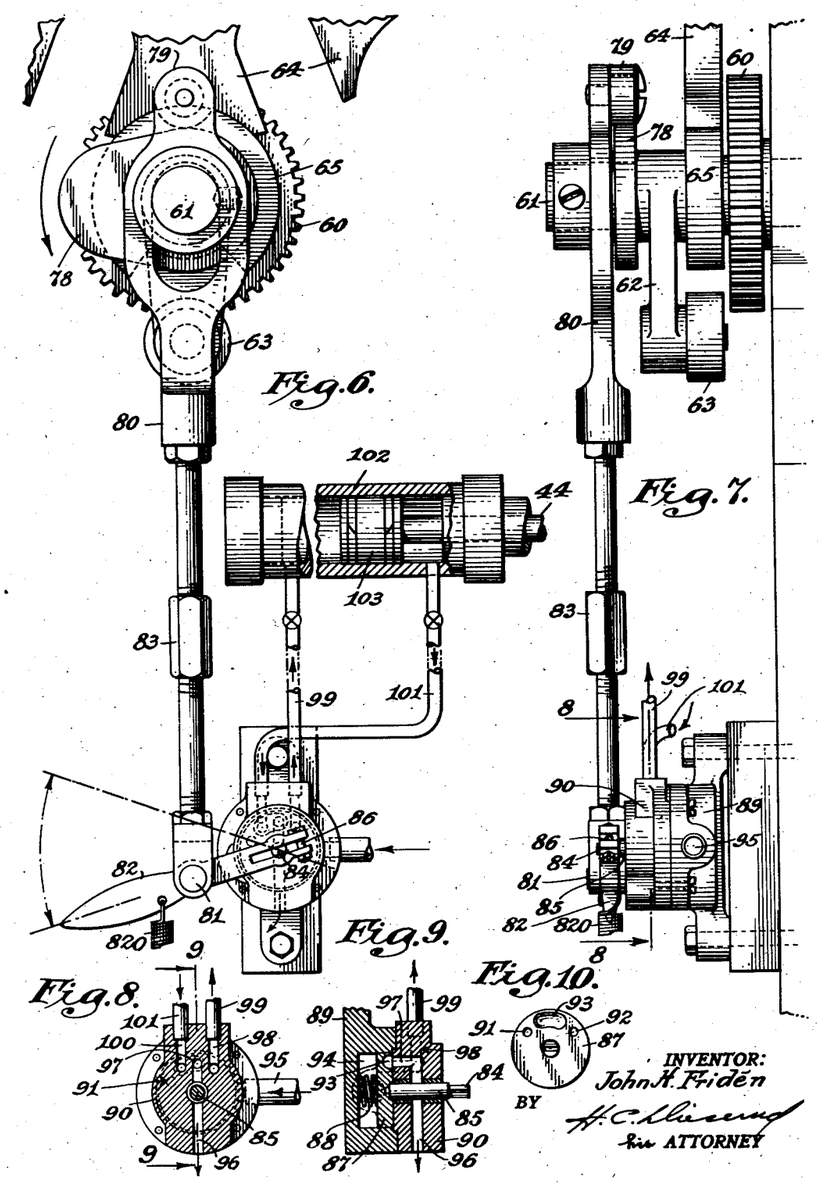
Figure 6 is an enlarged detail showing certain control devices and a pneumatic cylinder, partly broken away, used in applying the tubes to the spindles, the cylinder being turned through an angle of 90° from its operating position to better illustrate the construction.
Figure 7 is a side view of the parts shown in Figure 6, the cylinder being omitted.
Figure 8 is a detail in section along the line 8—8 of Figure 7.
Figure 9 is a sectional view along the line 9—9 of Figure 8.
Figure 10 is a face view of an element forming part of a pneumatic control valve.

At the inner end of the stud 85 there is arranged a bronze disc 87 adapted to be turned by the stud. A spring 88 coacting between the disc 87 and a portion of the valve casing 89 holds the disc against the surface of another portion 90 of the valve casing. Disc 87 is provided with two holes or ports 91 and 92 which extend completely through the same and with an elongated depression or recess 93 in the face that cooperates with member 90. Within the member 89 an air chamber 94 is provided and this is placed in communication with a source of air under pressure through a pipe 95. Member 90 has a passage 96, which is open to the atmosphere and thus provides an exhaust passage, as will be explained. The upper end of the passage 96 is turned at right angles, as indicated at 97, and extends to the inner face of the member 90 to cooperate with the recess 93. A passage 98 extending from the inner face of member 90 to the top of the same communicates with a pipe 99 while a similar passage 100 communicates with a pipe 101. The pipes 99 and 101 communicate with opposite ends of a cylinder 102 having therein pistons 103 connected with the previously mentioned rod 44.

The operation of the pneumatic system thus explained is as follows:

In the normal position of the parts as shown, air under pressure entering the valve through the pipe 95 is in communication with the pipe 99 through the port 92 of disc 87. This air under pressure has acted upon the piston 103 to force it toward the right in Figure 6 and serves to maintain it in this position, in which the rod 39 is retracted, as shown in Figure 2. At the same time the righthand end of the cylinder is in communication with the exhaust port 96 through pipe 101, passage 100 and recess 93. When the cam 78, in its rotation, raises the roller 79, it rocks the arm 82 into the position indicated by the dot and dash line (Fig. 6) and thus places the pipe 101 in communication with the air under pressure in chamber 94 and places the pipe 99 in communication with the exhaust port 96. This will, of course, cause the piston 103 to move toward the left (Fig. 6) and will cause the rod 39 to push the tube from the trough 35 onto the alined spindle. As the cam 78 continues its movement, the roller 79 will be permitted to descend under the action of spring 820 and thus restore the parts to the normal position indicated.

Figure 11:
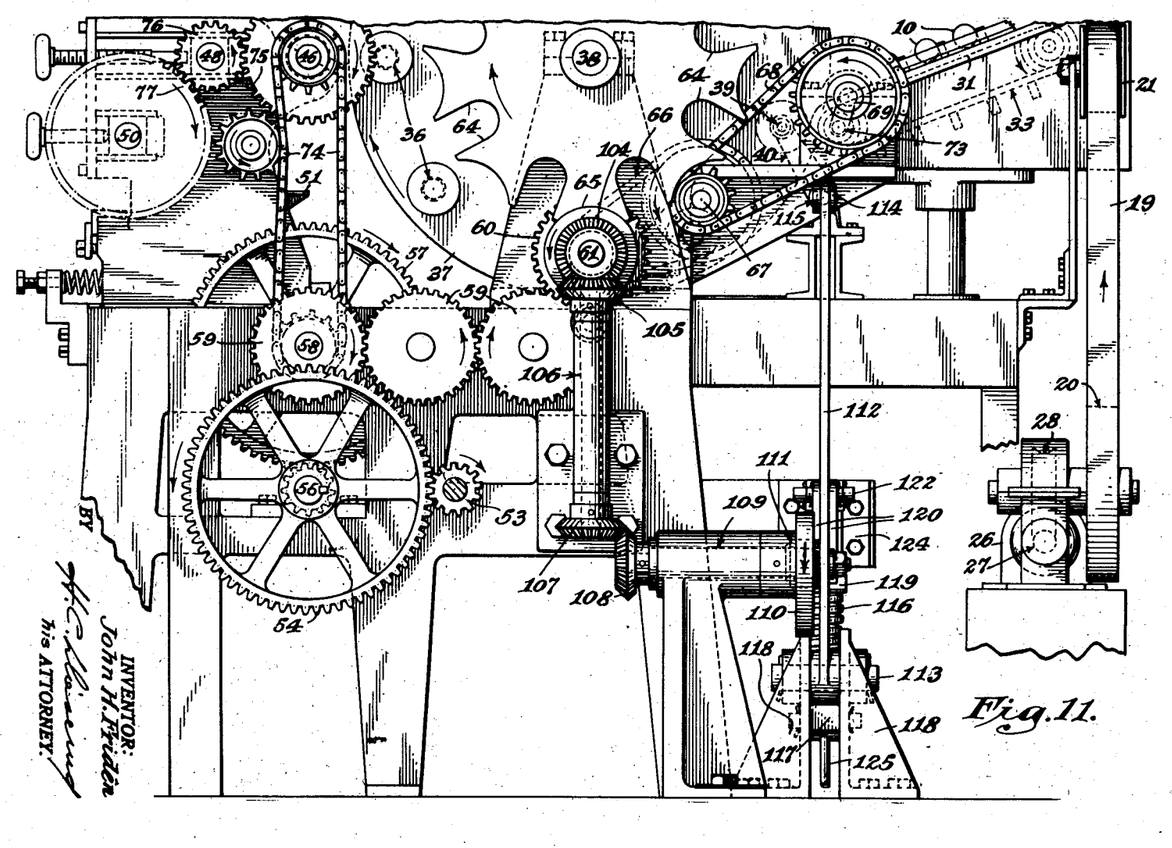
Figure 11 is a rear elevation of the lower portion of the apparatus, showing the driving means and showing a modified arrangement for applying the tubes to the spindles.
Figures 12, 13:
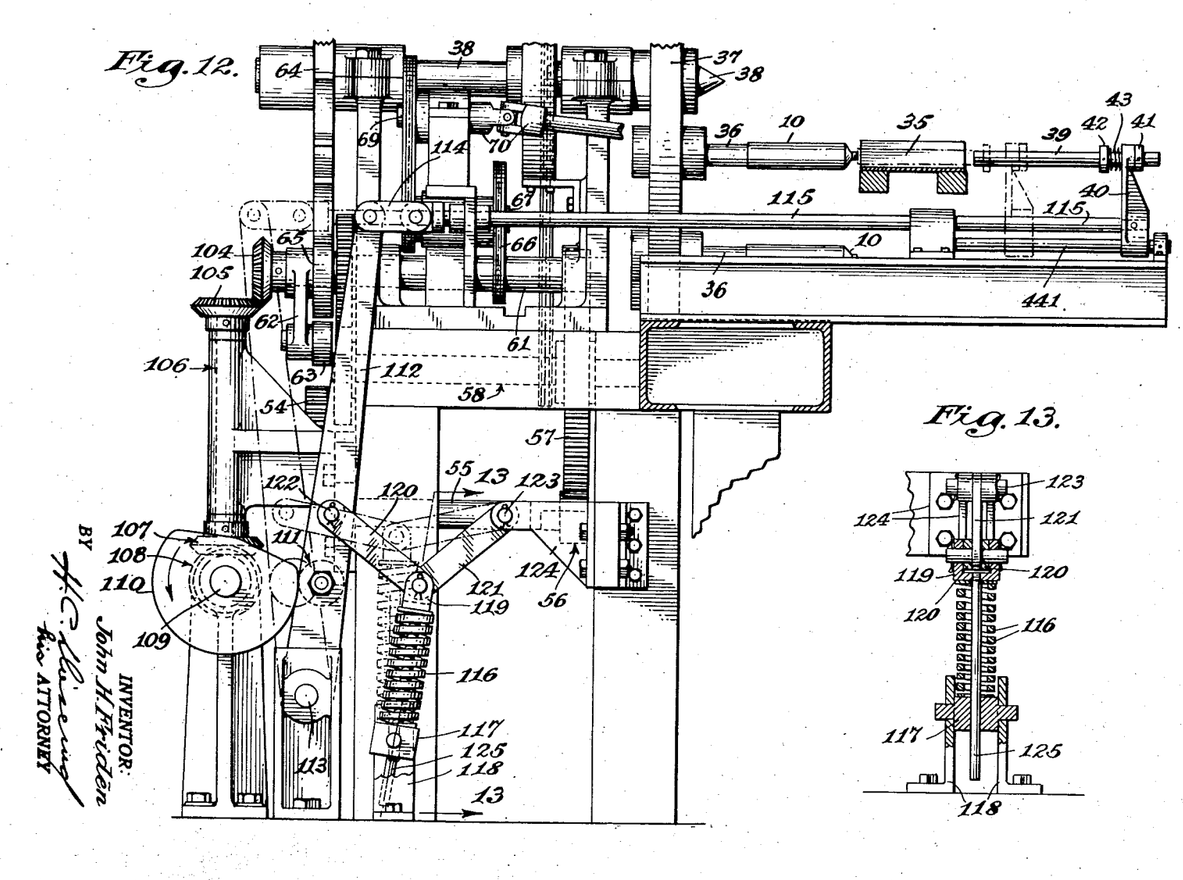
Figure 12 is a side elevation of the apparatus, showing the modified construction.
Figure 13 is a detail view in section along the line 13—13 of Figure 12.

Referring now to Figures 11, 12 and 13, there is illustrated a modified form of mechanism for operating the push rod 39 to transfer the tubes from the trough 35 to the spindles 36. In other respects the construction illustrated in these figures is substantially the same has has been explained. The driving or operating mechanism is the same except for the substitution of a new train of mechanism for that illustrated in Figures 6 to 10. In lieu of the cam 78 there is attached to the end of the shaft 61 a bevel gear 104. This meshes with a bevel gear 105 on a vertically extending shaft 106. At the lower end of the latter there is secured another bevel gear 107 which meshes with a companion bevel gear 108 secured to a horizontally extending shaft 109. The shafts 106 and 109 may be mounted in any suitable bearings carried by the main frame of the machine. At the opposite end of the shaft 109 is provided a cam 110 whose periphery is engaged by a roller 111 mounted on an arm 112 pivoted to the frame at 113. The upper end of arm 112 is connected by a link 114 with a rod 115 which in turn is connected with the arm 40 in the same way as the rod 44 of the first embodiment.

For the purpose of rocking the arm 112 counter-clockwise (Fig. 12) and retaining the roller 111 in engagement with the cam 110, a spring 116 is provided. This spring at its lower end acts upon a block 117 pivotally carried by a bracket 118 secured to the machine frame. The upper end of the spring acts upon a member 119 connected to the pivot pin of a pair of toggle links 120 and 121. Link 120 is pivotally attached to the arm 112 at 122 while link 121 is pivotally attached at 123 to a bracket 124 secured to the machine frame. Member 119 preferably has a rod 125 extending downwardly therefrom centrally within the spring 116.

It will be seen that this arrangement is such that the spring 116 will constantly urge the arm 112 in a counter-clockwise direction (Fig. 12) and hold the roller 111 against the cam 110. A particular advantage of the arrangement is that the force with which the spring acts upon the arm 112 is relatively high even when the spring becomes extended as it approaches the dotted line position indicated. In the ordinary direct connection of a spring to an arm, the force applied to the arm of course varies with the tension of the spring. Therefore, as the spring becomes extended, assuming it to be a compression spring, the force which it exerts rapidly diminishes. With the present arrangement, on the other hand, the mechanical advantage of the toggle linkage, as the two links approach a straight line, is such that the diminshed force of the spring will be greatly amplified in acting upon the arm 112. If desired, the arrangement may be such that a greater force is exerted upon the arm 112 when the spring is extended into the dotted-line position than when it is compressed into its full-line position. Or, if desired, the arrangement may be such that a substantially uniform force may be applied to the arm 112 throughout the operation of the spring. If the tube is to be mounted on a spindle, having a tip intended to bite into the metal of the neck of the tube, it is usually desirable to impart a somewhat greater force to the pusher element at the end of its stroke than at the beginning. By adjusting the final position to which the toggle links 120 and 121 will be forced by the spring, the amount of pressure exerted against the arm 112 at different points in the operation may be varied to suit the particular requirements.

The operation of the apparatus as a whole is believed to be clear from the foregoing detailed description. However, a brief resume will now be given.

Tubes 10 are continually being brought into the path of movement of the upper course of belt 19 by means of the chain 11. As a tube is carried onto the belt it will be withdrawn from the supporting pin and carried between the guides 29 and 30. It will then roll or be forced down to the incline 31 where each tube is lodged between successive pairs of pins 34. At the lower end of the incline the tube is deposited in the trough 35. Here it is engaged by the push rod 39 which forces it onto one of the spindles 36. These spindles are given a step-by-step movement in a counter-clockwise direction (Fig. 1) through the action of the Geneva mechanism on the shaft 38. On the fourth step of movement the tube is carried into cooperation with a coacting roller 45 which applies a finishing coat to the surface of the tube. Other operations might be performed upon the tube while supported on the spindle either in lieu of or in addition to the coating operation mentioned. As the spindle is carried upwardly from the coating roller, the coated tube is removed either by hand or automatically and may be applied to one of the empty pins on the chain 11 or may be transferred to another conveyor for a final drying treatment.

While certain illustrative embodiments of the invention have been explained in considerable detail, it will be understood that numerous variations may be made without departing from the general principles and scope of the invention. Various portions of the combined structure, though particularly suited for the special combination illustrated, are capable of broader application. The terms and expressions employed herein are to be considered as terms of description and not of limitation.

What I claim is:

1. In apparatus for handling delicate, collapsible tubular members a conveyor chain arranged to be advanced, means on said chain for supporting said tubular members, and a continuously driven belt having a substantially smooth surface arranged to frictionally engage said members and to cooperate with said supporting means to produce relative vertical movement between said members and the supporting means for removing said members from said supporting means in a direction transverse to the direction of advance of the conveyor chain.

2. In apparatus for handling delicate, collapsible tubular members an endless conveyor arranged to be advanced continuously, means on said conveyor for freely supporting tubular members, an endless belt in the path of movement of members on said supporting means and having a substantially smooth surface arranged to frictionally engage said members and to cooperate with said supporting means to produce relative vertical movement between said members and the supporting means, and means for shifting said belt while engaged by said members for removing the latter from said supporting means in a direction transverse to the direction of advance of the conveyor chain.

3. In apparatus for handling delicate, collapsible tubular members an endless conveyor arranged to be continuously advanced, means on said conveyor for freely supporting tubular members, an endless belt in the path of movement of members on said supporting means and having a substantially smooth surface arranged to frictionally engage said members and to cooperate with said supporting means to produce relative vertical movement between said members and the supporting means, and means for continuously shifting said belt independently of the advance of said conveyor.

4. In apparatus for handling delicate, collapsible tubular members an endless conveyor, a series of pins on said conveyor for loosely supporting tubular members, and a member having a continuously advancing substantially smooth surface in the path of movement of said tubular members arranged to frictionally engage said members and to cooperate with said supporting pins to produce relative vertical movement between said members and the supporting pins for removing the latter from said pins in a direction substantially parallel thereto.

5. In apparatus of the class described an endless conveyor, a series of pins on said conveyor inclined upwardly at a small angle to the horizontal for loosely supporting tubular members, and a member having a continuously advancing surface in the path of movement of said tubular members for removing the latter from said pins, said surface being inclined upwardly at the same angle as said pins.

6. In apparatus of the class described an endless conveyor, a series of pins on said conveyor inclined upwardly at a small angle to the horizontal for loosely supporting tubular members, and means for frictionally engaging said members and movable therewith longitudinally of the pins to remove the members from the pins, said last named means including a friction surface inclined at a small angle to the horizontal in a direction transverse to said pins.

7. In apparatus for handling delicate, collapsible tubular members an endless conveyor arranged to be continuously advanced, a series of pins on said conveyor for loosely supporting tubular members, and means having a substantially smooth surface for frictionally engaging said members as they are being advanced by said conveyor, said conveyor and frictionally engaging means arranged to produce relative vertical movement between said members and said pins, and said last named means shifting longitudinally relative to said pins to remove the members therefrom.

8. In apparatus for handling collapsible tubes a plurality of conveying means each having a series of projections adapted to extend into and support said tubes, one of said conveying means being moved continuously and the other intermittently, and means for automatically transferring the tubes from the projections of one of said conveying means to the projections of the other of said conveying means, said transferring means including a continuously operating endless member having a substantially smooth surface arranged below the path of movement of said projections for removing the tubes from said one of said conveying means and carrying the tubes thereon.

9. In apparatus for handling collapsible tubes a plurality of conveying means each having a series of projections adapted to extend into and support said tubes, and means for automatically transferring the tubes from the projections of one of said conveying means to the projections of the other of said conveying means, said last mentioned means including a continuously moving belt having a substantially smooth surface arranged below the path of movement of said projections for removing the tubes from one of said conveying means and carrying the tubes thereon.

10. In apparatus for handling collapsible tubes a plurality of tube supporting elements extending substantially horizontally and adapted to enter said tubes, said elements being arranged in two separate series, means for shifting the elements of one series continuously, means for shifting the elements of the other series intermittently, means including a continuously operated endless member having a substantially smooth surface arranged below the path of movement of an element in one series for withdrawing a tube from said element and carrying the tube thereon, means for conveying said tube to a position in line with an element in the other series, said withdrawing means constituting at least a part of said conveying means, and means for applying said tube to said element of said other series.

11. In apparatus of the class described a spindle, means for supporting a tubular member in line with said spindle, means for transferring a tubular member from said supporting means to said spindle, and means for operating said transferring means, said operating means including a spring and a toggle linkage exerting its endwise pressure upon said transferring means under the influence of said spring.

12. In apparatus of the class described a spindle, means for supporting a tubular member in line with said spindle, means for transferring a tubular member from said supporting means to said spindle, and yielding means for operating said transferring means with a substantially uniform application of force, said means comprising a spring and toggle linkage, which, when extended is substantially parallel with the direction of movement of said transferring means.

13. In apparatus of the class described a rotatable head, a plurality of spindles carried by said head, a shaft, means thereon for intermittently rotating said head, means for applying tubular members to said spindles, and means on said shaft for controlling the operation of said last mentioned means to apply a tubular member to one of said spindles during the period of rest between rotating movements of said head, said applying means comprising a reciprocatory push rod and means comprising a spring and toggle linkage operated thereby for applying a substantially uniform force thereto throughout its effective stroke, said toggle linkage being arranged to transmit its end-wise pressure to said push-rod.

14. In apparatus of the class described a continuously moving conveyor having pins arranged at an angle to the horizontal to receive and retain tubular members, an intermittently rotatable head having horizontally disposed mandrels adapted to receive and support said members, means arranged below the path of movement of said pins operating continuously in one direction at an angle to the path of movement of said pins and having a substantially smooth surface for engaging and removing said members from said pins as they arrive at a predetermined position, means for delivering said members to a position in line with a mandrel on said head, said removing means constituting at least a part of said delivery means, and reciprocating means for transferring said members from said last mentioned position to said mandrels on said head.

15. In apparatus of the class described a continuously moving conveyor having pins arranged at an angle to the horizontal to receive and retain tubular members, an intermittently rotatable head having horizontally disposed mandrels adapted to receive and support said members, means arranged below the path of movement of said pins operating continuously in one direction at an angle to the path of movement of said pins and having a substantially smooth surface for engaging and removing said members from said pins as they arrive at a predetermined position, means for delivering said members to a position in line with a mandrel on said head, said removing means constituting at least a part of said delivery means, and reciprocating means for transferring said members from said last mentioned position to said mandrels on said head, said continuously operating means and said reciprocating means being driven from independent sources.

16. In apparatus of the class described a continuously moving conveyor having pins arranged at an angle to the horizontal to receive and retain tubular members, an intermittently rotatable head having horizontally disposed mandrels adapted to receive and support said members, means arranged below the path of movement of said pins operating continuously in one direction at an angle to the path of movement of said pins and having a substantially smooth surface for engaging and removing said members from said pins as they arrive at a predetermined position, means for delivering said members to a position in line with a mandrel on said head, said removing means constituting at least a part of said delivery means, reciprocating means for transferring said members from said last mentioned position to the mandrels on said head, common means for intermittently rotating said head and operating said reciprocating means, and independent operating means for driving said continuously operating means.

17. In apparatus of the class described a continuously moving conveyor having pins arranged to receive and retain delicate, collapsible tubular members, a rotatable head, a series of mandrels on said head, an operating shaft, means on said shaft for intermittently rotating said head, continuously advancing means arranged below the path of movement of said pins and having a substantially smooth surface for engaging and removing said members from said conveyor as they arrive at a predetermined position, means for delivering said members to a position in line with a mandrel on said head, said removing means constituting at least a part of said delivering means, and reciprocating means controlled by said shaft for transferring one of said members from said last mentioned position to a mandrel on said head while the latter is at rest.

18. In apparatus of the class described a continuously moving conveyor having pins arranged to receive and retain delicate, collapsible tubular members, a rotatable head, a series of mandrels on said head, an operating shaft, means on said shaft for intermittently rotating said head, continuously advancing means arranged below the path of movement of said pins and having a substantially smooth surface for engaging and removing said members from said conveyor as they arrive at a predetermined position, means for conveying said members in spaced relation and delivering said members singly to a position in line with a mandrel on said head, said removing means constituting a part of said conveying and delivering means, and reciprocating means controlled by said shaft for transferring said members from said last mentioned position to a mandrel on said head while the latter is at rest.

JOHN H. FRIDÉN.